United States Patent
Zhang

(10) Patent No.: US 6,885,646 B2
(45) Date of Patent: Apr. 26, 2005

(54) DYNAMIC SEQUENCING OF TIMESLOTS IN WIRELESS COMMUNICATION SYSTEMS

(75) Inventor: Guodong Zhang, Patchogue, NY (US)

(73) Assignee: InterDigital Technology Corporation, Wilmington, DE (US)

( * ) Notice: Subject to any disclaimer, the term of this patent is extended or adjusted under 35 U.S.C. 154(b) by 0 days.

(21) Appl. No.: 10/747,747

(22) Filed: Dec. 29, 2003

(65) Prior Publication Data

US 2004/0190474 A1 Sep. 30, 2004

Related U.S. Application Data

(60) Provisional application No. 60/458,069, filed on Mar. 26, 2003.

(51) Int. Cl.[7] ................................................. H04Q 7/28
(52) U.S. Cl. ........................ 370/330; 370/329; 370/322; 455/450
(58) Field of Search ........................... 340/3.1, 534, 26, 340/870.11; 370/298, 320–322, 326, 329, 330, 335–337, 342, 345, 347, 348, 436, 441–443, 465, 478, 479, 498; 455/67.13, 422.1, 428, 450, 452.1; 705/14

(56) References Cited

U.S. PATENT DOCUMENTS

| | | | | |
|---|---|---|---|---|
| 6,745,045 | B1 | * | 6/2004 | Terry et al. .................. 455/522 |
| 6,747,967 | B1 | * | 6/2004 | Marinier ..................... 370/337 |
| 6,748,220 | B1 | * | 6/2004 | Chow et al. ................ 455/450 |
| 2002/0042274 | A1 | * | 4/2002 | Ades .......................... 455/445 |

* cited by examiner

Primary Examiner—Wellington Chin
Assistant Examiner—John Shew
(74) Attorney, Agent, or Firm—Volpe and Koenig, P.C.

(57) ABSTRACT

A method and system for assigning resources in wireless communication systems is disclosed. Timeslots allocated for handling user traffic are evaluated to create a plurality of timeslot sequences. Resources are assigned to the allocated timeslots according to the timeslot sequence having the lowest total interference.

16 Claims, 4 Drawing Sheets

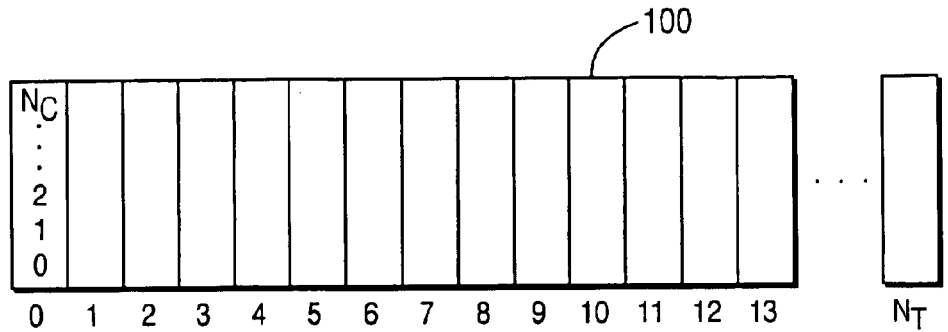
FIG. 1
PRIOR ART
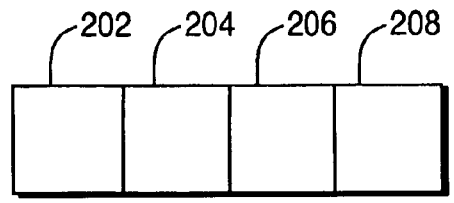
FIG. 2
PRIOR ART
| 402 | 404 | 406 | 408 |
|---|---|---|---|
| TIMESLOT: 1<br>FOM VALUE: 3<br>ORDER IN TIMESLOT SEQUENCE: 3RD | TIMESLOT: 2<br>FOM VALUE: 21<br>ORDER IN TIMESLOT SEQUENCE: 1ST | TIMESLOT: 3<br>FOM VALUE: -2<br>ORDER IN TIMESLOT SEQUENCE: 4TH | TIMESLOT: 4<br>FOM VALUE: 7.1<br>ORDER IN TIMESLOT SEQUENCE: 2ND |
FIG. 4

DYNAMIC SEQUENCING OF TIMESLOTS IN WIRELESS COMMUNICATION SYSTEMS

CROSS REFERENCE TO RELATED APPLICATION(S)

This application claims priority from U.S. provisional application No. 60/458,069 filed on Mar. 26, 2003, which is incorporated by reference as if fully set forth.

FIELD OF INVENTION

The present invention relates to wireless communication systems. More particularly, the present invention relates to assigning resources in wireless communication systems.

BACKGROUND

Wireless communication systems generally divide the time axis into continuing intervals of equal duration called frames. As shown in FIG. 1, a frame 100 is divided into a finite number (Nt) of intervals of equal duration called timeslots. A particular base station (or transceiver in the case of a sectored deployment) may use some or all of the timeslots for uplink or downlink transmissions as defined by the base station's timeslot assignment (i.e. the timeslots within each frame that have been allocated for uplink or downlink user traffic). In each timeslot, a finite number of codes (Nc) may be assigned for transmission/reception of voice and/or data (hereinafter "calls"). The timeslot(s) and code(s) assigned for a particular call (either in the downlink or the uplink) may be referred to as the physical channel(s) on which the call is being carried.

When a new call is initiated, a radio resource management (RRM) device determines the timeslot(s) and the number of codes in each timeslot that will be assigned to the new call. Typically, codes and timeslots are assigned either sequentially or at random. That is, referring now to FIG. 2, assume based on interference (e.g. which timeslots are being used for user traffic in neighboring cells) and/or traffic volume considerations that four particular timeslots 202, 204, 206, 208 within a particular frame have been allocated for handling uplink traffic. It is noted that although the four timeslots are shown for simplicity as being adjacent to each other, this is of course not necessary.

Where resources are assigned sequentially, the first code of a new call is assigned to the first timeslot 202. Additional codes (of the new call and subsequent calls where possible) are also assigned to timeslot 202 until no more codes may be assigned to timeslot 202 because, for instance, adding any more codes to timeslot 202 would degrade the signal-to-noise ratio or violate the maximum allowed transmit power constraint in the timeslot 202. Once timeslot 202 is no longer able to accept additional codes, further codes are assigned to timeslot 204 until it can no longer accept any more codes. This pattern continues for timeslots 206 and 208, as needed.

Where resources are assigned randomly, timeslots and codes are simply chosen at random. That is, in FIG. 2, a new call may have any of its codes assigned to any of the four timeslots assuming the conditions in the timeslots are sufficient for acceptance of codes.

Neither sequential nor random timeslot assignment is an efficient use of the timeslots that have been allocated for uplink and downlink user traffic because they fail to consider the conditions in the allocated timeslots. Therefore, it is desirable to have a method and system without such limitations.

SUMMARY

The present invention is a method and system for assigning resources in wireless communication systems. Timeslots allocated for handling user traffic are evaluated to create a plurality of timeslot sequences. Resources are assigned to the allocated timeslots according to the timeslot sequence having the lowest total interference.

BRIEF DESCRIPTION OF THE DRAWING(S)

FIG. 1 is a frame having a plurality of timeslots wherein each timeslot a plurality of codes may be assigned.

FIG. 2 is a plurality of timeslots allocated for handling user traffic.

FIG. 4 is a plurality of timeslots wherein a Figure of Merit has been computed for each timeslot and the timeslots are arranged in a timeslot sequence according to their respective Figures of Merit.

DETAILED DESCRIPTION OF THE PREFERRED EMBODIMENT(S)

Figure 3:
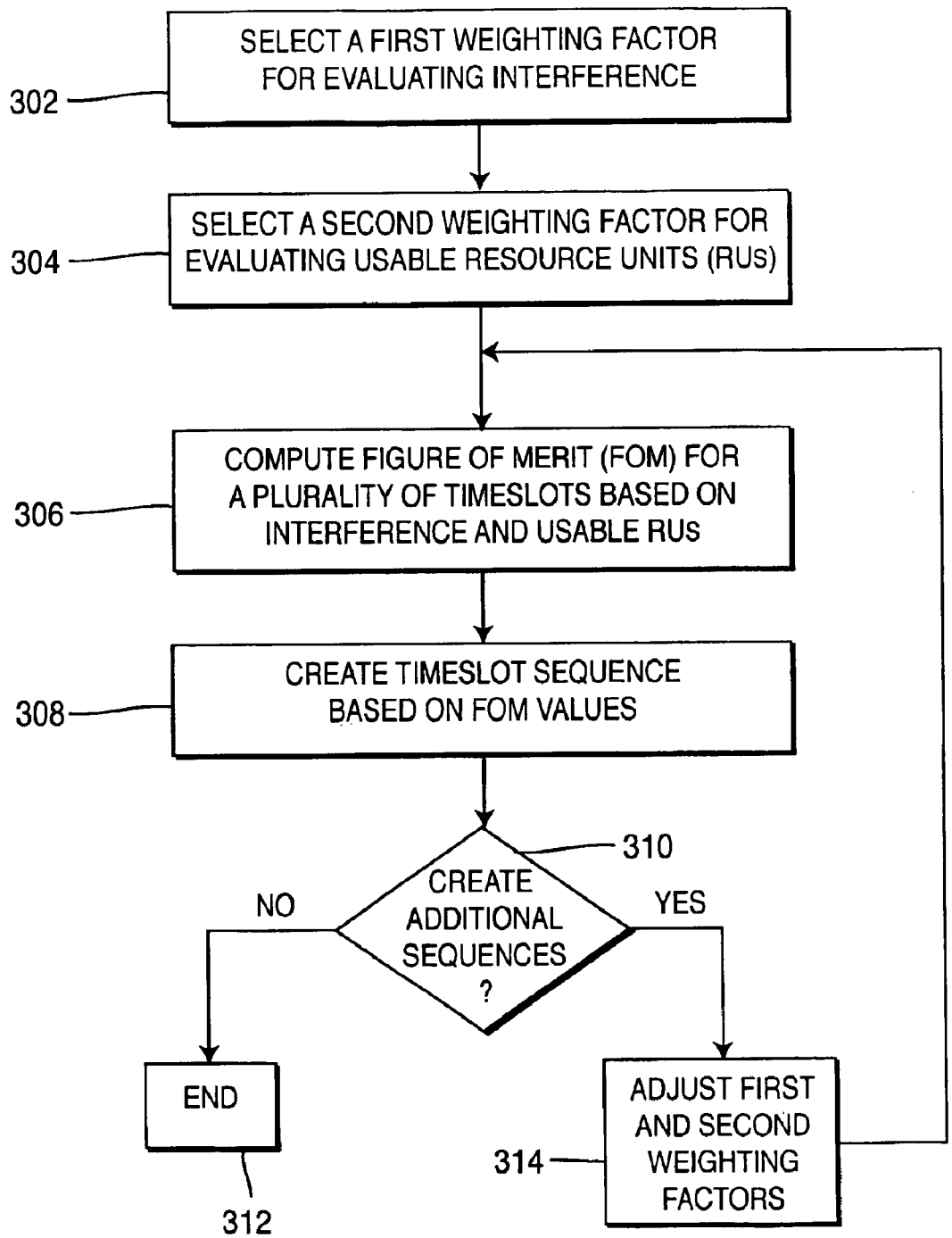
FIG. 3 is a method for generating a plurality of timeslot sequences for assigning codes so that system resources are optimized.

Hereafter, a wireless transmit/receive unit (WTRU) includes but is not limited to a user equipment, mobile station, fixed or mobile subscriber unit, pager, or any other type of device capable of operating in a wireless environment. When referred to hereafter, a base station includes but is not limited to a Node-B, site controller, access point or any other type of interfacing device in a wireless environment. Further, as mentioned in the Background section, it should be noted that the term "call" is used to collectively refer to voice and/or data transmission/reception.

In wireless communication systems, it is preferable to assign codes of new calls to timeslots in such a manner that the collective interference (i.e. the total effective interference) of the assigned codes is minimized. The total effective interference is a function of the interference caused by each individual assigned code and the fragmentation of the assigned codes making up each call. With respect to interference, the lower the interference of each code the lower the total effective interference. Similarly, with respect to fragmentation, the lower the fragmentation of a group of assigned codes making up a particular call the lower the total effective interference. That is, again with respect to fragmentation, there is more interference generated where assigned codes making up a particular call are distributed over, for example, two timeslots as opposed to one.

The total effective interference is given by $$I_{et} = \left( \sum_{k=1}^{K} I(k) \cdot \frac{16}{SF(k)} \right) \cdot \text{frag\_penalty}(j) \quad \text{Equation 1}$$

where l(k) is the interference of code k, SF(k) is the spreading factor of code k, and j is the number of time slots used for the new call.

As explained above, the total effective interference is based on the interference of each assigned code in a frame and the manner in which those codes are distributed across the timeslots making up that frame. When a new call is initiated therefore, the present invention generates a plurality of timeslot sequences, hypothetically assigns the codes of the new call to the timeslot sequences to measure the total effective interference for each timeslot sequence, and actually assigns the codes to the timeslot sequence yielding the lowest total effective interference. To create a timeslot sequence, timeslots allocated for user traffic are ranked according to a Figure of Merit (FOM). The FOM of a particular timeslot, say timeslot i is given by $$FOMi = -\alpha * \Delta Ii + \beta * RU_{usable}(i) \qquad \text{Equation 2}$$

In Equation 2, $\Delta Ii$ is the difference between the measured interference (in dB) in timeslot i (i.e. $I_i$) and the lowest interference among all timeslots (i.e. $I_{min}$) allocated for user traffic in a particular direction (i.e. uplink or downlink). $\alpha$ is a weighting factor for adjusting the weight given to the interference parameter in calculating a timeslot's FOM. $RU_{usable}(i)$ is the amount of resource units that can be used by a new call in timeslot i. $\beta$ is a weighting factor for adjusting the weight given to the resource unit parameter in calculating a timeslot's FOM.

The amount of usable resource units in a particular timeslot is given by $$RU_{usable}(i) = \min(RU_i, \min(M, RU_{max})) \qquad \text{Equation 3}$$

In Equation 3, $RU_i$ is the number of resource units that are available in timeslot i, M is the amount of resource units required by the new call, and $RU_{max}$ is the maximum amount of resource units that can be used by a new call in timeslot i. It should be noted that $RU_{max}$ is typically limited by the wireless transmit/receive unit (WTRU) used to originate the new call. Therefore, $RU_{max}$ is typically given by the amount of codes the originating WTRU is capable of using per timeslot. By way of explanation, a resource unit is the use of one code in one timeslot at a spreading factor of sixteen. For lower spreading factors, more resource units are considered used. To illustrate for a spreading factor 8, two resource units are considered used and for a spreading factor of 1, sixteen resource units are considered used.

It is preferable to have a plurality of timeslot sequences from which the sequence that finally yields the lowest total effective interference may be selected. The number of sequences that are generated are purely operator preference. To generate additional sequences, the weighting factors ($\alpha,\beta$) are adjusted thereby resulting in additional new FOMs for each timeslot and possibly new sequences. Once a desired number of timeslot sequences are generated, codes are hypothetically assigned thereto resulting in a different total effective interference for each timeslot sequence. Finally, the one with the lowest total effective interference is selected and codes are assigned to those timeslots in sequential order. Of course, the sequences may be adjusted as codes are assigned because each timeslots FOM may change as a result of codes being added thereto.

Referring now to FIG. 3, there is shown a method 300 for generating a plurality of timeslot sequences for assigning codes so that system resources are optimized. The method 300 may be used in each direction (i.e. uplink and downlink) to generate a plurality of uplink timeslot sequences and a plurality of downlink timeslot sequences.

The method 300 begins with step 302 wherein a first weighting factor ($\alpha$) is selected for evaluating the interference in each timeslot. Next, in step 304, a second weighting factor ($\beta$) is selected for evaluating the number of useable resource units in each timeslot. Once the weighting factors are selected, a FOM is computed for each timeslot allocated for user traffic in the direction (i.e. uplink or downlink) for which the sequence is being generated (step 306). As explained above, the FOM of each timeslot is a function of interference and the number of resource units that can be used for the new call.

In step 308, the timeslot sequence is created based on the FOM values. To create the sequence, the timeslots are put in order of decreasing FOM. Therefore, the first timeslot in a timeslot sequence has the highest FOM of the group and the last timeslot in the sequence has the lowest FOM of the group. In step 310, it is determined whether additional timeslot sequences are to be created. If no, the method ends (step 312). In yes, the first ($\alpha$) and second ($\beta$) weighting factors are adjusted and the method 300 cycles back to step 306.

To further illustrate the creation of timeslot sequences, reference is now made to FIG. 4. By way of example, assume we have created a downlink timeslot sequence using a particular pair of weighting factors wherein there are four downlink timeslots 402, 404, 406, 408. As explained in connection with FIG. 2, the timeslots are shown as being adjacent purely for convenience. Further assume that the FOM values of timeslots 402, 404, 406, 408 are 3, 21, –2, and 7.1 respectively. In this case, based on the FOM values, timeslot 404 is the first timeslot in the sequence, timeslot 408 is second, timeslot 402 is third, and timeslot 406 is fourth (i.e. the timeslot sequence is 404, 408, 402, and 406). Therefore, assuming this sequence is the sequence with the lowest total effective interference, when new calls are initiated their codes are assigned to timeslots according to the created sequence. That is, codes are assigned to timeslot 404 first until it reaches capacity, then to timeslot 408 until it reaches capacity and so on until timeslot 406 reaches capacity.

Figure 5:
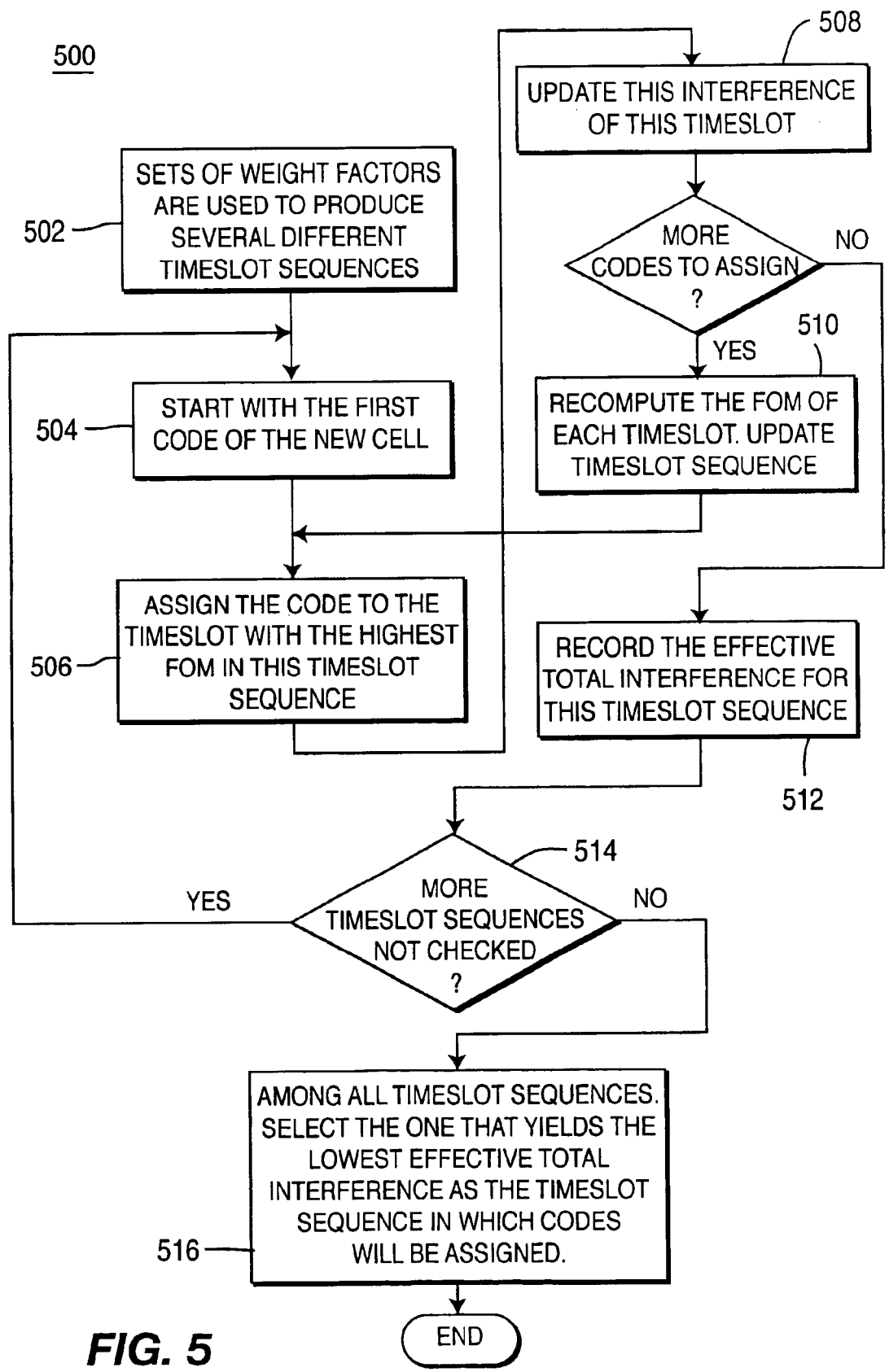
FIG. 5 is a method where a plurality of timeslot sequences are generated and the timeslot sequence and resources are assigned according to the timeslot sequence having the lowest total effective interference.

To illustrate a method by which the timeslot sequence with the lowest total effective interference is selected, reference is now made to method 500 shown in FIG. 5. The method 500 begins with step 502 wherein various sets of weight factors ($\alpha$, $\beta$) are used to produce several different timeslot sequences as explained above. Then starting with the first code of a new call (step 504), assign the code to the timeslot with the highest FOM in this timeslot sequence (step 506).

Once a code has been assigned to a timeslot, the interference in that timeslot typically increases. Therefore, once the code is assigned to the timeslot with the highest FOM in step 506, the interference in that timeslot is updated in step 508. If there are more codes to assign, the method proceeds to step 510 and then cycles back to step 506. In step 510, the FOM of each timeslot is recomputed and the timeslot sequence is updated to reflect any changes in the sequence based on the updated FOMs. If there are no more codes to assign, the method proceeds to step 512.

The FOM may be recomputed as shown below, if no code of the new call is assigned to timeslot i, $$FOM_i = -\alpha \cdot \Delta I_i + \beta \cdot RU_{usable}(i) \qquad \text{Equation 4}$$

if at least one code of the new call has been assigned to timeslot i, $$FOM_i = -\alpha \cdot \Delta I_i + \beta \cdot RU_{usable}(i) + \alpha \cdot \text{Hysteresis}, \qquad \text{Equation 5}$$

where $\Delta I_i$ and $RU_{usable}(i)$ take the updated values after the assignment of code(s) in previous steps. For timeslots where codes of the new call are already assigned, hysteresis is considered to favor those time slots. Therefore, a higher fragmentation penalty will occur only when timeslots unused by the new call have remarkably lower interference.

In step 512, the total effective interference for this timeslot sequence is recorded. Then, if there are any more timeslot sequences that have not yet been checked, the method 500 cycles back to step 504. If there are no more sequences to check, the timeslot sequence yielding the lowest total effective interference as the timeslot sequence in which codes will be assigned (step 516).

Figure 6:
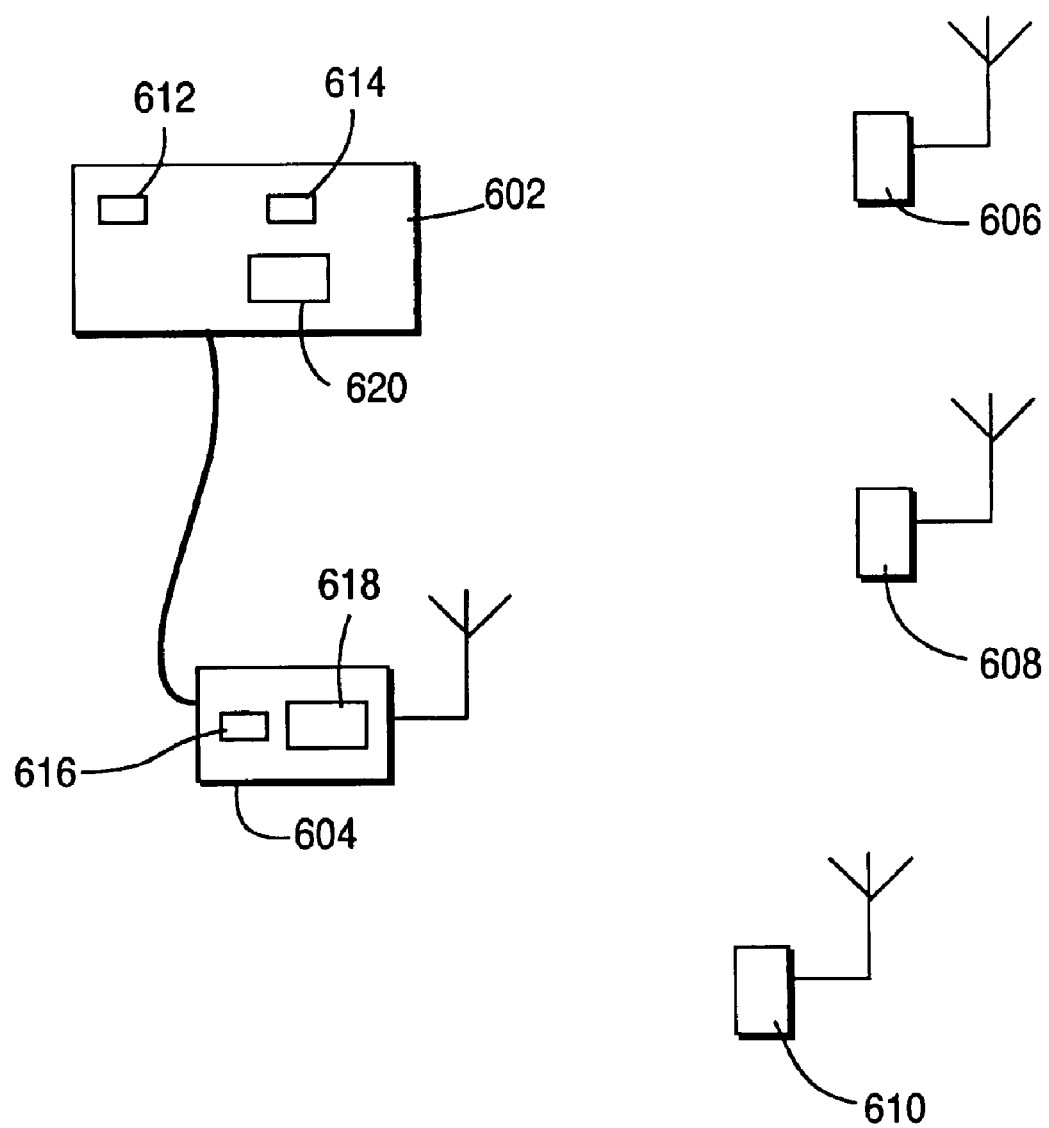
FIG. 6 is a wireless communication system wherein timeslot sequences are generated and system resources are assigned to wireless transmit/receive units according to the timeslot sequence with the lowest total effective interference.

Referring now to FIG. 6, there is shown a wireless communication system 600 wherein timeslots allocated for user traffic may be arranged in a timeslot sequence so as to optimize the assignment of system resources. The wireless communication system includes at least one radio network controller (RNC) 602, at least one base station 604, and a plurality of WTRUs 606, 608, 610. The RNC 602 includes a processor 612 configured to compute a FOM for a plurality of timeslots as explained in method 300 in FIG. 3. That is, the timeslots allocated for user traffic may be, in each direction, organized into a timeslot sequence that begins with the timeslot having the highest FOM and continues with the remaining timeslots in order of decreasing FOM. As explained above, processor 612 preferably generates a plurality of such timeslot sequences by adjusting the weighting factors used in computing the FOM.

Processor 612, or another processor 614, is configured to compute the total effective interference for each timeslot sequence as explained in method 500 of FIG. 5 and assign codes from new calls to the timeslot sequence having the lowest total effective interference. Processors 612, 614 may be located within a radio resource management (RRM) device 620 within radio network controller 602. The functionality of processors 612, 614 may also be performed at the at least one base station 604 using processors 616 and/or 618.

It is important to note that the present invention may be implemented in any type of wireless communication system employing any type of time division multiple access, such as time division duplex (TDD) technology, as desired. By way of example, the present invention may be implemented in UMTS-TDD, TD-SCDMA, CDMA2000 (EV-DO and EV-DV), or any other type of wireless communication system. Further, while the present invention has been described in terms of various embodiments, other variations, which are within the scope of the invention as outlined in the claim below will be apparent to those skilled in the art.

What is claimed is:

1. A method for assigning resources in a wireless communication system, the method comprising the steps of:
   determining an interference level in a plurality of timeslots allocated for user traffic;
   determining an amount of useable resources in the plurality of timeslots;
   computing a Figure of Merit (FOM) for each of the plurality of timeslots by assigning resources to at least the timeslot having higher FOMs than any other of the timeslots, recomputing the FOM for the at least one timeslot, and increasing the at least one timeslot FOM by a value to prefer assigning additional resources to the at least one timeslot;
   varying weighting factors applied to interference and useable resources in computing the FOM to generate a plurality of timeslot sequences;
   measuring the total effective interference for each timeslot sequence; and
   assigning system resources in timeslots according to the timeslot sequence having the lowest total effective interference.

2. The method of claim 1 wherein the resources are resource units in a time division duplex/code division multiple access communication system.

3. The method of claim 1 wherein the FOM for an $i^{th}$ timeslot is computed per $$FOMi = -\alpha * \Delta Ii + \beta * RU_{usable}(i)$$

where $\Delta Ii$ is a difference between the measured interference in timeslot i and the lowest interference among all timeslots allocated for user traffic in a particular direction, $\alpha$ is a weighting factor for adjusting the weight given to the interference parameter, $RU_{usable}(i)$ is the amount of resource units that can be used by a new call in timeslot I, and $\beta$ is a weighting factor for adjusting the weight given to the resource unit parameter.

4. The method of claim 1 wherein the total effective interference is given by $$I_{et} = \left( \sum_{k=1}^{K} I(k) \cdot \frac{16}{SF(k)} \right) \cdot \text{frag\_penalty}(j)$$

where $I(k)$ is the interference of code k, $SF(k)$ is the spreading factor of code k, and j is the number of time slots used for the new call.

5. A radio network controller comprising:
   a processor for assigning resources when at least one call is initiated in a wireless communication system, the processor configured to generate a plurality of timeslot sequences arranged according to each timeslot's FOM, select the timeslot sequence having the lowest total effective interference, and assign codes to timeslots according to the location of the timeslots within the timeslot sequence having the lowest total effective interference.

6. The radio network controller of claim 5 wherein the resources are resource units in a time division duplex/code division multiple access communication system.

7. The radio network controller of claim 5 wherein the FOM for an $i^{th}$ timeslot is computed per $$FOMi = -\alpha * \Delta Ii + \beta * RU_{usable}(i)$$

where $\Delta Ii$ is a difference between the measured interference in timeslot i and the lowest interference among all timeslots allocated for user traffic in a particular direction, $\alpha$ is a weighting factor for adjusting the weight given to the interference parameter, $RU_{usable}(i)$ is the amount of resource units that can be used by a new call in timeslot I, and $\beta$ is a weighting factor for adjusting the weight given to the resource unit parameter.

8. The radio network controller of claim 5 wherein the total effective interference is given by $$I_{et} = \left( \sum_{k=1}^{K} I(k) \cdot \frac{16}{SF(k)} \right) \cdot \text{frag\_penalty}(j)$$

where $I(k)$ is the interference of code k, $SF(k)$ is the spreading factor of code k, and j is the number of time slots used for the new call.

9. A base station comprising:

a processor for assigning resources when at least one call is initiated within the geographic coverage area of the base station, the processor configured to generate a plurality of timeslot sequences arranged according to each timeslot's FOM, select the timeslot sequence having the lowest total effective interference, and assign codes to timeslots according to the location of the timeslots within the timeslot sequence having the lowest total effective interference.

10. The base station of claim 9 wherein the resources are resource units in a time division duplex/code division multiple access communication system.

11. The base station of claim 9 wherein the FOM for an $i^{th}$ timeslot is computed per $$FOMi=-\alpha*\Delta Ii+\beta*RU_{usable}(i)$$

where $\Delta Ii$ is a difference between the measured interference in timeslot i and the lowest interference among all timeslots allocated for user traffic in a particular direction, $\alpha$ is a weighting factor for adjusting the weight given to the interference parameter, $RU_{usable}(i)$ is the amount of resource units that can be used by a new call in timeslot I, and $\beta$ is a weighting factor for adjusting the weight given to the resource unit parameter.

12. The base station of claim 9 wherein the total effective interference is given by $$I_{et} = \left( \sum_{k=1}^{K} I(k) \cdot \frac{16}{SF(k)} \right) \cdot \text{frag\_penalty}(j)$$

where I(k) is the interference of code k, SF(k) is the spreading factor of code k, and j is the number of time slots used for the new call.

13. A method for assigning resources in a wireless communication system, the method comprising the steps of:

determining an interference level in a plurality of timeslots allocated for user traffic;

determining an amount of useable resources in the plurality of timeslots;

computing a Figure of Merit (FOM) for each of the plurality of timeslots;

arranging the plurality of timeslots in a timeslot sequence according to the FOM of each timeslot;

repeating steps 1 through 4 to generate a plurality of timeslot sequences;

selecting the timeslot sequence with the lowest total effective interference; and assigning system resources in timeslots according to the timeslot sequence having the lowest total effective interference.

14. The method of claim 13 wherein the resources are resource units in a time division duplex/code division multiple access communication system.

15. The method of claim 13 wherein the FOM for an $i^{th}$ timeslot is computed per $$FOMi=-\alpha*\Delta Ii+\beta*RU_{usable}(i)$$

where $\Delta Ii$ is a difference between the measured interference in timeslot i and the lowest interference among all timeslots allocated for user traffic in a particular direction, $\alpha$ is a weighting factor for adjusting the weight given to the interference parameter, $RU_{usable}(i)$ is the amount of resource units that can be used by a new call in timeslot I, and $\beta$ is a weighting factor for adjusting the weight given to the resource unit parameter.

16. The method of claim 13 wherein the total effective interference is given by $$I_{et} = \left( \sum_{k=1}^{K} I(k) \cdot \frac{16}{SF(k)} \right) \cdot \text{frag\_penalty}(j)$$

where I(k) is the interference of code k, SF(k) is the spreading factor of code k, and j is the number of time slots used for the new call.

* * * * *

UNITED STATES PATENT AND TRADEMARK OFFICE
CERTIFICATE OF CORRECTION

PATENT NO. : 6,885,646 B2
DATED : April 26, 2005
INVENTOR(S) : Guodong Zhang

It is certified that error appears in the above-identified patent and that said Letters Patent is hereby corrected as shown below:

Column 2,
Line 63, after the word "where", delete "l(k)" and insert therefor -- I(k) --.

Column 4,
Line 15, after the word "(step 312).", delete "In" and insert therefor -- If --.
Line 16, after the word "adjusted", insert -- (step 314) --.

Column 5,
Line 8, after the word "checked", insert -- (step 514) --.
Line 48, before the word "below", delete "claim" and insert -- claims --.

Signed and Sealed this

Twenty-third Day of August, 2005

JON W. DUDAS
*Director of the United States Patent and Trademark Office*